United States Patent
Jagadishprasad et al.

(10) Patent No.: US 8,843,773 B2
(45) Date of Patent: Sep. 23, 2014

(54) SYSTEM AND METHOD FOR AUTOMATED SERVICE PROFILE PLACEMENT IN A NETWORK ENVIRONMENT

(75) Inventors: Praveen K. Jagadishprasad, Bangalore (IN); Gururaja A. Nittur, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 13/495,161

(22) Filed: Jun. 13, 2012

(65) Prior Publication Data

US 2013/0339776 A1   Dec. 19, 2013

(51) Int. Cl.
G06F 1/00 (2006.01)
G06F 1/32 (2006.01)
G06F 15/173 (2006.01)

(52) U.S. Cl.
USPC ............................ 713/300; 713/320; 709/223

(58) Field of Classification Search
CPC .................................................... G06F 1/3203
USPC ........................................................ 713/300
See application file for complete search history.

(56) References Cited

U.S. PATENT DOCUMENTS

| 7,793,126 | B2 * | 9/2010 | McGrane et al. | 713/320 |
| 7,827,267 | B2 * | 11/2010 | Chun | 709/223 |
| 7,930,573 | B2 * | 4/2011 | Bland et al. | 713/320 |
| 8,346,255 | B2 * | 1/2013 | Kukuchka et al. | 455/435.2 |
| 8,429,431 | B2 * | 4/2013 | Malik et al. | 713/300 |
| 8,671,294 | B2 * | 3/2014 | Malik et al. | 713/320 |

OTHER PUBLICATIONS

Bassett, et al., "Power Cap Control in Dell Poweredge M1000e Modular Blade Enclosures," Reprinted from Dell Power Solutions, Dec. 2009; 3 pages http://www.dell.com/Downloads/Global/Power/ps4q09-20100145-Bassett.pdf.
Cisco, White Paper, "Power Management in the Cisco Unified Computing System: An Integrated Approach," 2011; 13 pages http://www.cisco.com/en/US/solutions/collateral/ns340/ns517/ns224/ns944/white_paper_c11-627731.html.
Filani, et al., "Dynamic Data Center Power Management: Trends, Issues, and Solutions," Intel Technology Journal, vol. 12, Issue 01, Feb. 21, 2008, 12 pages.
Hewlett Packard Development Company, L.P., "Manual, HP Insight Power Manager," Dec. 2008; 49 pages.
IBM, "Online Manual, Setting the power cap value—Active Energy Manager (V4.1.1)," 2 pages; [retrieved and printed May 21, 2012] http://publib.boulder.ibm.com/infocenter/director/v6r1x/index.jsp?topic=/aem_410/frb0_t_power_cap.html.
VMWare, White Paper, VMWare Distributed Power Management Concepts and Use, 2010; 18 pages www.vmware.com/files/pdf/DPM.pdf.

* cited by examiner

*Primary Examiner* — Suresh Suryawanshi
(74) *Attorney, Agent, or Firm* — Patent Capital Group

(57) ABSTRACT

A method includes ranking a plurality of servers in a network environment according to power characteristics, and choosing a server from the plurality of servers for placement of a service profile according to at least a priority specified in the service profile and the server's rank. The ranking includes identifying power groups into which the plurality of servers are partitioned, identifying respective power group caps of the power groups, determining respective power ranges and respective power supply multipliers of the plurality of servers, calculating a score of each server in the plurality of servers, and assigning ranks to the scores. Choosing the server includes partitioning the servers into priority sets according to respective ranks of servers, and searching the priority sets beginning with a priority set having the priority specified in the service profile until a suitable server is found.

20 Claims, 6 Drawing Sheets

| RANK PERCENTILE | PRIORITY |
|---|---|
| 100-90 | 1 |
| 90-80 | 2 |
| 80-70 | 3 |
| 70-60 | 4 |
| 60-50 | 5 |
| 50-40 | 6 |
| 40-30 | 7 |
| 30-20 | 8 |
| 20-10 | 9 |
| 10-0 | 10 |

| RANK PERCENTILE | PRIORITY |
|---|---|
| 100-88 | 1 |
| 88-75 | 2 |
| 75-65 | 3 |
| 65-55 | 4 |
| 55-45 | 5 |
| 45-35 | 6 |
| 35-25 | 7 |
| 25-14 | 8 |
| 14-7 | 9 |
| 7-0 | 10 |

# SYSTEM AND METHOD FOR AUTOMATED SERVICE PROFILE PLACEMENT IN A NETWORK ENVIRONMENT

TECHNICAL FIELD

This disclosure relates in general to the field of communications and, more particularly, to a system and a method for automated service profile placement in a network environment.

BACKGROUND

Power consumption accounts for a significant portion of a data center's operating costs. Mechanical and electrical costs associated with power consumption represent more than 80% of the capital cost of the data center. As the increasing number and functionalities of applications in data centers grow, power consumption and consequent operating costs can also increase. For example, one projection has estimated costs that can range from $12,500 per kW for low tier data centers running low power applications, to upwards of $25,000 per kW for high tier data centers running high power applications. Over the past decade, the costs associated with power consumption have increased 400% and these costs are expected to continue to rise. At the same time, increasing complexity of applications may demand sophisticated ways to distribute applications over servers with varying operating and power characteristics.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes ranking a plurality of servers in a network environment according to power characteristics; and selecting a server from the plurality of servers for placement of a service profile according to, at least, a priority specified in the service profile and a particular rank associated with one of the plurality of servers. The term "selecting" is inclusive of any type of assignment, designation, choosing, provisioning, creating a record to reflect an assignment or obligation, etc. In more specific instances, the ranking comprises identifying power groups into which the plurality of servers is partitioned; identifying respective power group caps of the power groups; determining respective power ranges and respective power supply multipliers of the plurality of servers; calculating a score of each server in the plurality of servers; and assigning ranks to the scores.

In yet other implementations, a particular one of the servers is ranked higher than the other servers based on a higher power group cap of the particular server's associated power group, the particular server's capability, and a number of power supply units accessible by the particular server. In other scenarios, for each respective power group into which the plurality of servers are partitioned, the method can include identifying a respective power group cap; and determining a sum of power ranges for substantially all servers in each of the respective power groups.

Example Embodiments

Figure 1:
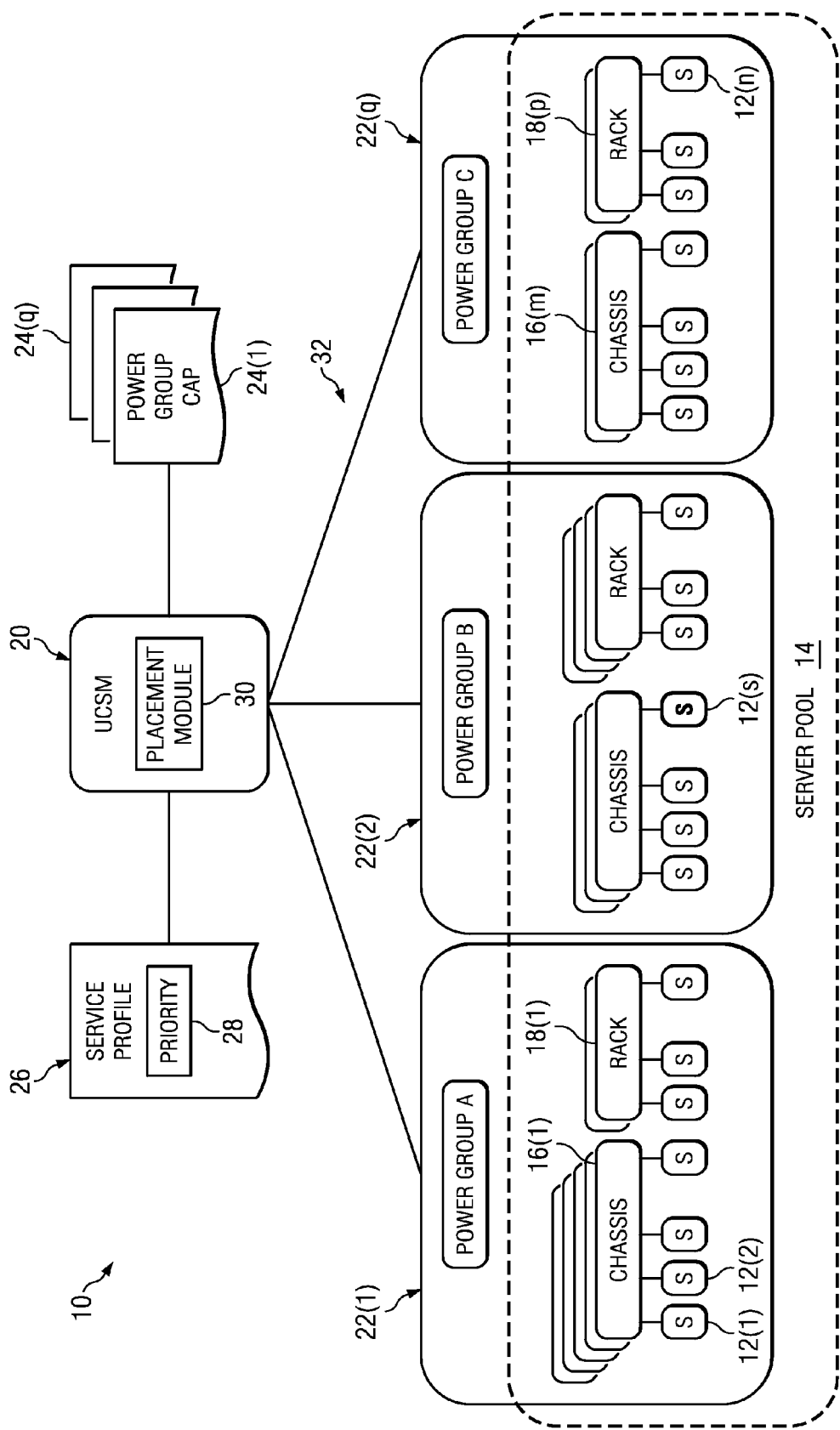
FIG. 1 is a simplified block diagram illustrating an example communication system for automated service profile placement in a network environment in accordance with one embodiment of the present disclosure.

Turning to FIG. 1, FIG. 1 is a simplified block diagram illustrating a communication system 10 for automated service profile placement in a network environment in accordance with one example embodiment. FIG. 1 illustrates a communication system 10 including a plurality of servers 12(1)-12(n) in a server pool 14. Servers 12(1)-12(n) may be provisioned in chassis 16(1)-16(m) and/or racks 18(1)-18(p). Servers 12(1)-12(n) may be managed by one or more management units called a unified computing system manager (UCSM) 20. UCSM 20 may separate servers 12(1)-12(n) into discrete power groups 22(1)-22(q) (e.g., power group A, power group B, power group C), each of power groups 22(1)-22(q) being associated with respective power group caps 24(1)-24(q). A service profile 26 may be provisioned for configuring one or more of servers 12(1)-12(n) in communication system 10. Service profile 26 may include a priority 28, among other parameters and features. A placement module 30 associated with UCSM 20 may facilitate an automated service profile placement of service profile 26 to a server (e.g., server 12(s)) in a network 32.

According to embodiments of communication system 10, service profile 26 may be associated with one of servers 12(1)-12(n), for example, server 12(s), selected from server pool 14 based on various considerations. Servers 12(1)-12(n) may be ranked according to various parameters, such as server capability (e.g., considering inventory), power group caps 24(1)-24(q), and power supply capacity (e.g., minimum required versus available power supply capacity). To select server 12(s), servers 12(1)-12(n) may also be filtered based on constraints such as non-power related constraints (e.g., hardware constraints), and high availability policies. Server 12(s) may be associated with service profile 26 based on a rank of server 12(s) and priority 28 (among other parameters).

Certain terminologies are used with regard to the various embodiments of communication system 10. As used herein, the term "server" encompasses computing resources that can perform computational tasks for clients over a network (e.g., network 32). Servers 12(1)-12(n) can include server computers such as database servers, file servers, mail servers, print servers, and web servers; personal computers (e.g., blade PC) that operate in conjunction with a client access device such as a thin client; and workstations (e.g., blade workstations) that operate similarly to a blade PC, with more computing power. Servers 12(1)-12(n) can include blade servers mounted on chassis 16(1)-16(m). Blade servers are stripped-down computers with modular designs optimized to minimize use of physical space and energy. Blade servers are configured to be mounted on chassis 16(1)-16(m), which provide multiple non-computing services, such as power distribution and cooling. Servers 12(1)-12(n) can also include rack servers mounted on racks 18(1)-18(p). Rack servers are computers dedicated to be used as servers and configured to be installed in a rack framework. Racks 18(1)-18(p) may include multiple bays, each designed to hold one server in place with screws or other fastening devices. A single rack (e.g., rack 18(1)) can hold multiple servers stacked together (e.g., one over the other), consolidating network resources, and minimizing floor space.

The term "service profile" can include a software definition of a server (e.g., servers 12(1)-12(n)), which may include its storage and network characteristics and configuration settings. When service profile 26 is deployed to server 12(s), UCSM 20 may configure the server, adapters, fabric extenders, fabric interconnects, and other network elements to match the configuration settings specified in service profile 26. Service profile 26 can leverage configuration policies created by server 12(s), network 32, and administrators. In some embodiments, service profile 26 may override server identity, for example, facilitating stateless computing in communication system 10. Service profile 26 can take configuration settings from a resource pool preconfigured in UCSM 20.

As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

A "power group" can include a partition of servers 12(1)-12(n) that draw power from a common power distribution unit (PDU). Each of power groups 22(1)-22(q) is unique, and do not share servers; a server cannot belong to more than one power group. In many embodiments, a facility administrator may create power groups 22(1)-22(q) and populate them with servers 12(1)-12(n) based on various considerations, such as power connectivity. "Power group caps" of a power group can include a maximum power consumption (e.g., budget) for that power group. The facility administrator may set power group caps 24(1)-24(q), for example, according to breaker panel ratings for the data center. UCSM 20, along with other network elements, may ensure that power group caps 24(1)-24(q) are not exceeded irrespective of workload, hardware changes (e.g., server or power supply unit insertion or removal), and other network changes. For example, power group cap 24(1) sets a total power consumption of servers in power group 22(1). Power group cap 24(1) may be partitioned and distributed by UCSM 20 to substantially all servers in power group 22(1).

As used herein, the term "priority" of a server (e.g., server 12(s)) indicates the importance of the server (to the enterprise), or a hierarchy. According to embodiments of communication system 10, service profile 26 may include a power control policy, which may influence priority 28. The network administrator (or other user) can also set priority 28. Priority 28 may also be influenced by computing, storage, and/or network characteristics associated with service profile 26. Applications associated with service profile 26 and their associated hardware requirements may further influence priority 28. For example, an Oracle® application, which may demand greater availability and hardware resources, may indicate a priority of 1, whereas a test server application, which may not be a critical service, may indicate a priority of 10. Additionally, workload usage characteristics can influence priority 28. For example, servers that are used more often may have a higher priority, and vice versa. A higher priority 28 can imply higher budget allocation (e.g., in terms of power consumption) for associated server 12(s), and vice versa. In some embodiments, priority 28 may be according to a priority range, which may be from 1 to 10, with 1 being the highest priority, 10 being the lowest priority, and 5 being a default priority. In some embodiments, priority 28 may specify a maximum power cap for associated server 12(s).

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Service profile (SP) association and disassociation are enablers to fast provisioning in a data center network environment. "Placement" of a service profile can include the process of choosing a suitable server from among multiple servers for association with the service profile where the choice is constrained by various considerations. Typical placement strategies have used central processing unit (CPU), memory, storage, and such other computing, storage and/or network characteristics as constraints in choosing the suitable server for the service profile. Other strategies may ignore the hardware and/or network parameters in the service profile altogether and merely consider power as the sole constraint for choosing the suitable server. There are currently no strategies for selecting a server based on computing, storage, network, and power characteristics.

As used herein, the term "power characteristics" of a server can include power group caps applicable to the server, the server's power consumption, a number of power supply units (PSUs) accessible by the server, an efficiency of power supply (e.g., operating at capacity above, at, or below power needed for the server to function correctly), a power range, which can be a difference between maximum power consumption and minimum power needed (e.g., a minimum of boot power and minimum capable power), server hardware (e.g., number of CPUs, memory elements, storage capacity, etc.), server capability (e.g., number of applications that can be run on the server, the server's processing speed, the server's reliability, etc.), or other such features.

In a typical data center network, the management software (e.g., UCSM 20) may reside in a fabric interconnect and control several chassis (e.g., chassis 16(1)-16(m)) through respective chassis management controllers (CMCs). Each CMC may reside in a chassis and manage several blades through a baseband management controller (BMC). The BMC may control a basic input output system (BIOS) in the respective blade. The facility administrator (or other user)

may enter a power group cap (e.g., 10,000 W) for each power group through the management software. The management software may split up the power group cap for the different servers in the power group, propagating all the way down to the BIOS of each server. If all the servers were identical, the power allocation would have been uniform among the servers. However, because servers may have different hardware installed therein, power allocation can differ among the servers. For example, a better equipped server (e.g., with more powerful processors and larger memory) may get a bigger budget of the power group cap.

In typical placement scenarios, the network administrator (or other user) may manually (or semi-manually) select a server association for a specific service profile. Such manual (or semi-manual) placements can present a challenge because of the large number of servers from which to choose the suitable server. Some mechanisms for automatic selection operating with limited set of constraints may exist in the marketplace; even if the limited functionality offered by such mechanisms are ignored, such mechanisms may be outright greedy and choose the best server available, without accounting for a possibility of higher priority service profiles being considered for placement in the future. Moreover, with multiple UCSMs in a large-scale deployment, the automatic choice is further challenged.

Communication system 10 is configured to address these issues (and others) in offering a system and a method for automated service profile placement in a network environment. Constraints such as power group caps, server inventory, server capabilities, priority, and PSU capacity may be considered for service profile placement. According to various embodiments, placement module 30 may rank servers 12(1)-12(n) according to power characteristics, and choose server 12(s) for placement of service profile 26 according to at least priority 28 and the server's calculated rank. Servers 12(1)-12(n) may be ranked by identifying their corresponding power groups 22(1)-22(q), identifying respective power group caps 24(1)-24(q) of power groups 22(1)-22(q), determining respective power ranges and respective power supply multipliers of servers 12(1)-12(n), calculating a score of each server, and assigning ranks to the scores.

According to various embodiments, the server choice may be implemented by identifying service profile 26 (e.g., from a group of several service profiles), identifying server pool 14, and partitioning server pool 14 into priority sets according to respective ranks of server 12(1)-12(n) in server pool 14. Each priority set may be assigned a specific priority. The priority sets may be searched beginning with a priority set having priority 28 specified in service profile 26, until suitable server 12(s) is found.

Embodiments of communication system 10 may provide for scalable and automated placement of service profile 26 in large data centers: providing a simple and efficient mechanism that considers system state and power policies with incoming service profile priority 28 to make an effective placement. Embodiments of communication system 10 can additionally provide fully automated placement, with almost zero administrator input (e.g., manual placement), irrespective of the data center scale, with thousands of servers and millions of service profiles. Embodiments of communication system 10 can also co-exist with manual placement as the eligible server pool includes non-associated servers (e.g., servers that are not yet placed or configured according to a service profile).

Embodiments of communication system 10 can enable scalable administration, displacing manual error-prone selection involving hundreds of calculations for each association. Moreover, a dynamic data center could have high rate of associations and disassociations making incorrect placement highly probable with manual placement. By replacing (or complementing) manual placement, embodiments of communication system 10 can reduce errors and further enable quick and efficient service profile placement. Moreover, communication system 10 may be server agnostic, implementing the selection and placement operations described herein irrespective of the server type (e.g., blade server, or rack server, etc.). In some embodiments, mechanisms for service profile placement as provided herein may not include floating point arithmetic (e.g., using integer arithmetic instead), leading to a decrease in the order of complexity of the mechanisms from $n^2$ (i.e., $O(n^2)$) during initialization to n (i.e., $O(n)$) past initialization. Once past initialization, mechanisms may provide for using a linked-list type manager for additions, modifications, and deletions of server rankings, possibly making it memory efficient.

Turning to the infrastructure of communication system 10, the network topology can include any number of servers, routers, gateways, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, UCSM 20 may be software that provides unified, embedded management of software and hardware components in network 32 across multiple servers 12(1)-12(n). UCSM 20 may manage communication system 10 as a single entity through a graphical user interface (GUI), a command-line interface (CLI), or an Extensible Markup Language (XML) Application Programming Interface (API). UCSM 20 may be embedded in one or more Fabric Interconnects using a clustered, active-standby configuration for high availability. UCSM 20 may participate in server provisioning, device discovery, inventory, configuration, diagnostics, monitoring, fault detection, auditing, and statistics collection, among other functions.

In some embodiments, placement module 30 may be an application embedded within UCSM 20. In other embodiments, placement module 30 may be a stand-alone application accessible by UCSM 20. An "application" as used herein this Specification, can be inclusive of an executable file comprising instructions that can be understood and processed on a computer, and may further include library modules loaded during execution, object files, system files, hardware logic, software logic, or any other executable modules.

Figure 2:
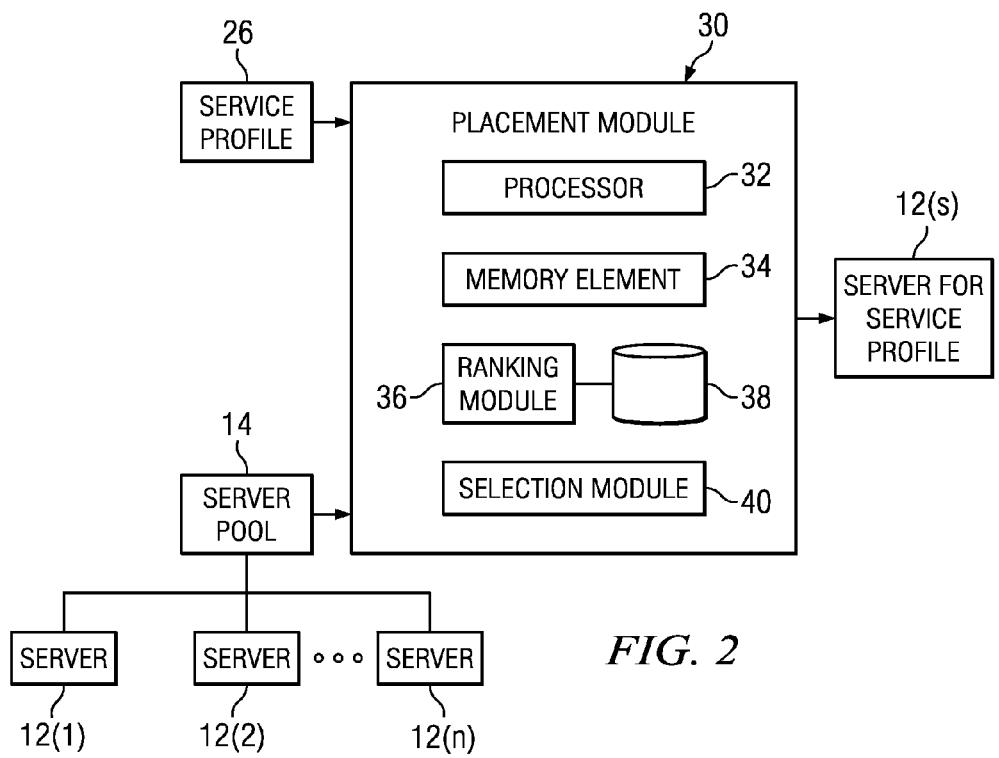
FIG. 2 is a simplified block diagram illustrating example details of the communication system in accordance with one embodiment.

Turning to FIG. 2, FIG. 2 is a simplified block diagram illustrating example details of placement module 30. Placement module 30 may take (as inputs) service profile 26 and information about servers 12(1)-12(n) in server pool 14, and provide (as output) selected server 12(s) for association with service profile 26. Placement module 30 may include a processor 32, a memory element 34, a ranking module 36, and a selection module 40. In various embodiments, ranking module 36 may rank servers 12(1)-12(n) according to various power characteristics, such as power group caps, power ranges, and PSUs provided in each server. Servers 12(1)-12(n) may be assigned respective ranks based on these power characteristics. Placement module may perform operations described herein using at least processor 32 and memory element 34.

In various embodiments, ranking module 36 may assign a higher rank to the servers in the group with a higher power group cap. Ranking module 36 may assign a higher rank to a better-equipped server. Ranking module 36 may assign a higher rank when PSUs are sufficient to meet maximum demand. Ranking module 36 may assign a low rank when PSUs may be insufficient at the time of ranking (or in the future). Moreover, ranking module 36 may assign a lower rank to the servers that have a relatively lower capability compared to other servers in the same power group.

For example, assume that G(i) is power group cap 24(i) for power group 22(i). Assume that R(i,j) is a power range of server 12(j) in power group 22(i), and S(i) is the sum of power ranges for servers in power group 22(i). As used herein, the term "power range" of the server is the difference between the maximum power consumed by the server and minimum power needed by the power (e.g., calculated as the minimum of boot power and minimum capable power). The value of the power range can approximate server capability. A better-equipped server may have a higher power range.

Let M(i,j) be a power supply multiplier (PSM) for server 12(j). PSM may be assigned a value of 0.5 when the server is operating at capacity below that needed for the chassis to function correctly. For example, chassis 16(k) may include server 12(j) and include five PSUs to provide power to eight servers. Such a configuration may result in lower capacity when all eight servers are operational. PSM may be assigned a value of 1.0 when the server is operating at capacity needed for the chassis to function correctly. Turning back to the earlier example, if chassis 16(k) has eight PSUs to provide power to eight servers, the configuration may result in PSM of 1.0. PSM may be assigned a value of 1.1 when the server is operating above capacity needed for chassis to function correctly. Turning back to the earlier example, if chassis 16(k) has ten PSUs to provide power to eight servers, the configuration may operate above capacity.

In another example, for chassis 16(k) with a total of 4 PSUs when 2 PSUs are needed for correct functionality (e.g., chassis 16(k) operates two blade servers), PSM may be 0.5 with 1 functional PSU; PSM may be 1.0 with 2 functional PSUs; PSM may be 1.1 with 3 or more PSUs. In yet another example, for rack 18(k) with a total of 2 PSUs when 1 PSU is needed for correct functionality (e.g., rack 18(k) supports a single server), PSM may be 1.0 with 1 PSU; PSM may be 1.1 with 2 PSUs.

According to various embodiments, a score of server 12(j) in power group 22(i) may be calculated as {R(i,j)×G(i)×M(i, j)}/S(i). The score may be directly proportional to the power range R(i, j) (e.g., higher power range may indicate a better equipped server, leading to a higher score); the score may be directly proportional to power group cap 24(i) (e.g., higher power group cap indicates a higher power allocation for the power group); and the score may be directly proportional to the PSM (e.g., higher PSM indicates a better power capacity). In some embodiments, the score may be stored in descending order of ranks (e.g., rank 1 has higher score) for example, in a rank database 38. Ranks may be updated when servers 12(1)-12(n) are inserted, removed, associated, or disassociated.

Placement module 30 may include a selection module 40 that selects server 12(s) for associating with service profile 26. The association process involves first associating service profile 26 to server pool 14. Server pool 14 can be created by the network administrator, or automatically, for example, through qualifiers. There may also be a default pool that contains all the servers managed by UCSM 20. Once server pool 14 is identified, a server selection algorithm may start automatically. First, selection module 40 looks at the non-power related constraints (e.g., memory requirements, CPU speed, etc.). Servers that do not meet the non-power related constraints may be removed from the selection process.

Next, a High Availability (HA) policy of service profile 26 may be looked at. For example, none of the service profiles in a HA cluster may be in the same power group. Servers that do not meet the HA policy of service profile 26 (e.g., servers are from the groups which have associated service profiles from the same HA cluster as service profile 26) may be removed from the selection process. Subsequently, priority sets may be created and populated with servers 12(1)-12(n) according to their respective ranks. The priority sets may be searched (e.g., sequentially, in a round robin manner, or ascending manner, or descending manner), until suitable server 12(s) is found. The selection process may maintain fair share for unequal priority distribution, providing a compromise between two extremes: (i) allocating higher ranked servers reserved for later higher priority service profiles; and (ii) losing out to lower priority service profiles, which can come in a swarm later and occupy the higher ranked servers.

The algorithm may not have information about incoming service profile priority distribution beforehand. For example, there could be 1000 servers and 1 millions service profiles. It may be impossible to determine the next service profile presented to communication system 10 for placement. Therefore, a simple lookup would be insufficient to allocate a server with a particular rank to the service profile. Given the constraints of server and service profiles with seemingly arbitrary priorities, selection module 40 provides a reasonable quality of service for the higher priorities (e.g., associating higher ranked servers with higher priority service profiles).

Figure 3:
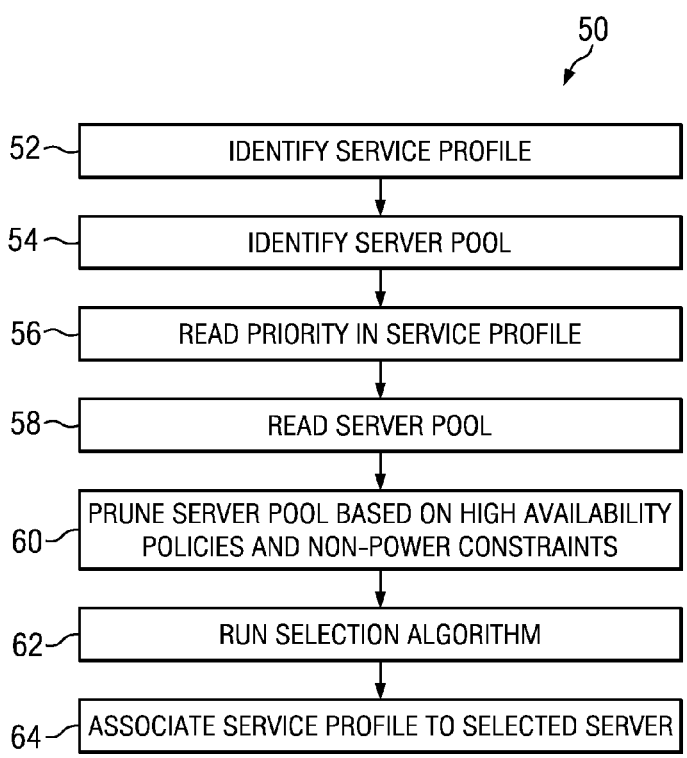
FIG. 3 is a simplified flow diagram illustrating example operations that may be associated with an embodiment of communication system.

Turning to FIG. 3, FIG. 3 is a simplified flow diagram illustrating example operations that may be associated with embodiments of communication system 10. Operations 50 may include operation 52, at which service profile 26 may be identified (for example, from among several service profiles). In an example embodiment, the network administrator may present service profile 26 for placement. At 54, server pool 14 may be identified. In an example embodiment, server pool 14 may be presented by the network administrator for selecting a suitable server.

At 56, placement module 30 may read priority 28 in service profile 26. At 58, placement module 30 may read server pool 14. For example, placement module 30 may determine the number and type of servers in server pool 14, including their hardware characteristics, and other information relevant to the selection process. At 50, placement module 30 may prune server pool 14 based on high availability policies and non-power related constraints. As used herein, the term "pruning" can include removing non-compliant servers that do not meet particular criteria. For example, servers that do not meet high availability policies and non-power related constraints may be pruned from server pool 14. At 62, placement module 30 may run a selection algorithm. At 64, communication system 10 may associate selected server 12(s) to service profile 26.

Figure 4:
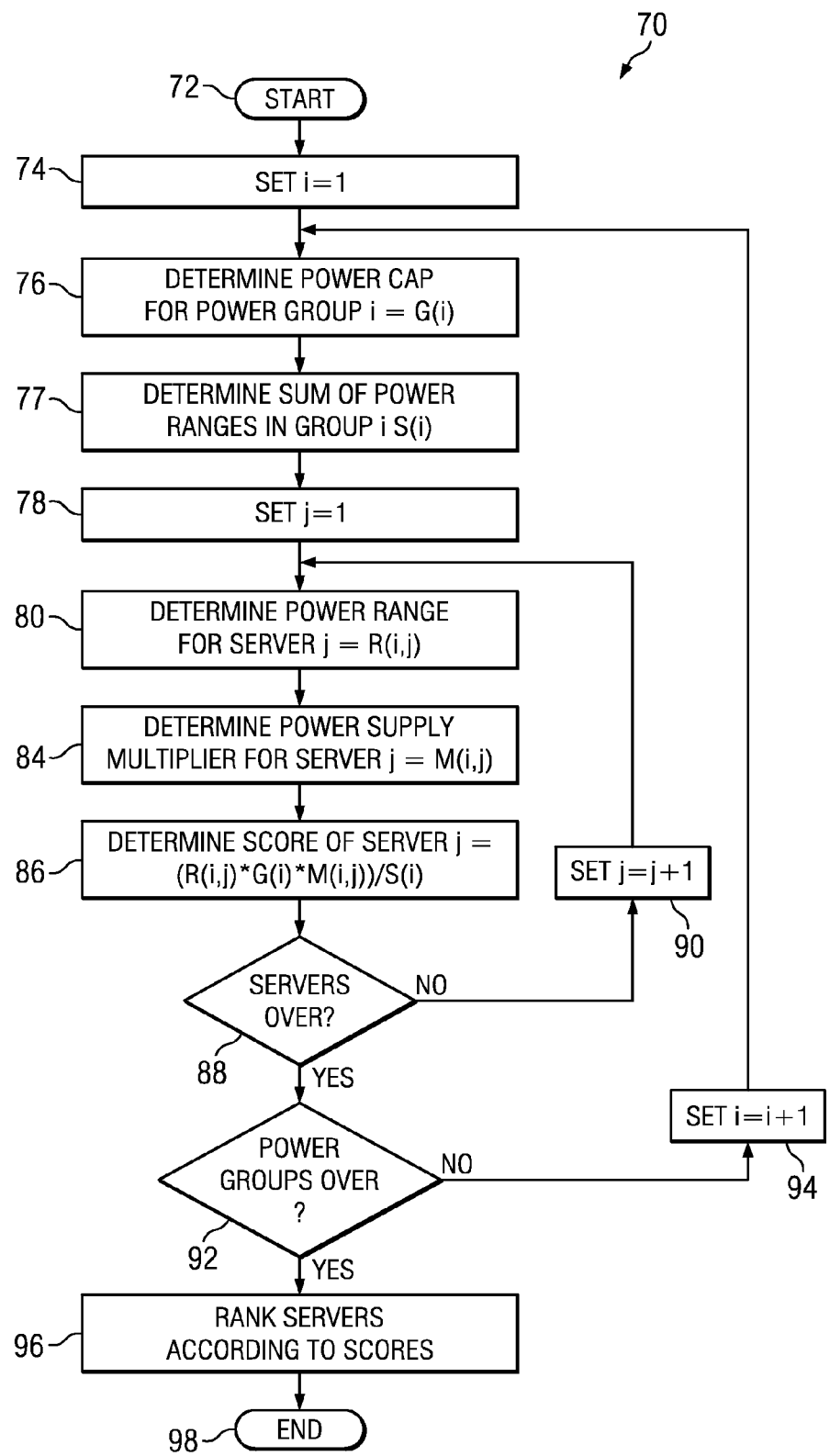
FIG. 4 is a simplified flow diagram illustrating other example operations that may be associated with an embodiment of communication system.

Turning to FIG. 4, FIG. 4 is a simplified flow diagram illustrating example operational activities that may be associated with ranking servers 12(1)-12(n) in embodiments of communication system 10. Operations 70 may start at 72, for example, when placement module 30 is functional. At 74, parameter "i" is initialized to 1. At 76, placement module 30 may determine power group cap 24(i) for group i to be G(i). At 77, a sum of power ranges S(i) for group i is calculated. S(i) may be calculated once at system initialization and updated as needed when servers are added or removed from the group. At 78, parameter j may be initialized to 1. At 80, placement module 30 may determine the power range for server j (e.g., 12(j)) in group i to be R(i,j). At 84, placement module 30 may determine the power supply multiplier for server j to be M(i, j). At 86, placement module 30 may determine the score for server j to be $\{R(i,j) \times G(i) \times M(i,j)\}/S(i)$. At 88, a determination may be made whether the servers in group i are over. If not, at 90, parameter j may be advanced by 1, and the operations may loop back to 80 to be repeated for next server 12(j+1).

If servers in group i are over (e.g., substantially all servers in group i have been scored), a determination may be made at 92 whether all power groups 22(1)-22(q) are over (e.g., substantially all servers in server pool 14 have been scored). If not, parameter i may be advanced by 1 at 94, and operations may loop back to 76, to be repeated for next power group 22(i+1). If power groups 22(1)-22(q) are over at 92, servers 12(1)-12(n) may be ranked according to respective scores at 96. For example, ranks may be assigned to the scores (e.g., highest score may get a rank of 1). In one example embodiment, the ranking may be in reverse order of the scores, with higher scores being given a lower rank value (e.g., rank 1 given to a score of 100, rank 2 given to a score of 99, and so on). The operations may end at 98 in this example scenario.

Figures 5, 8:
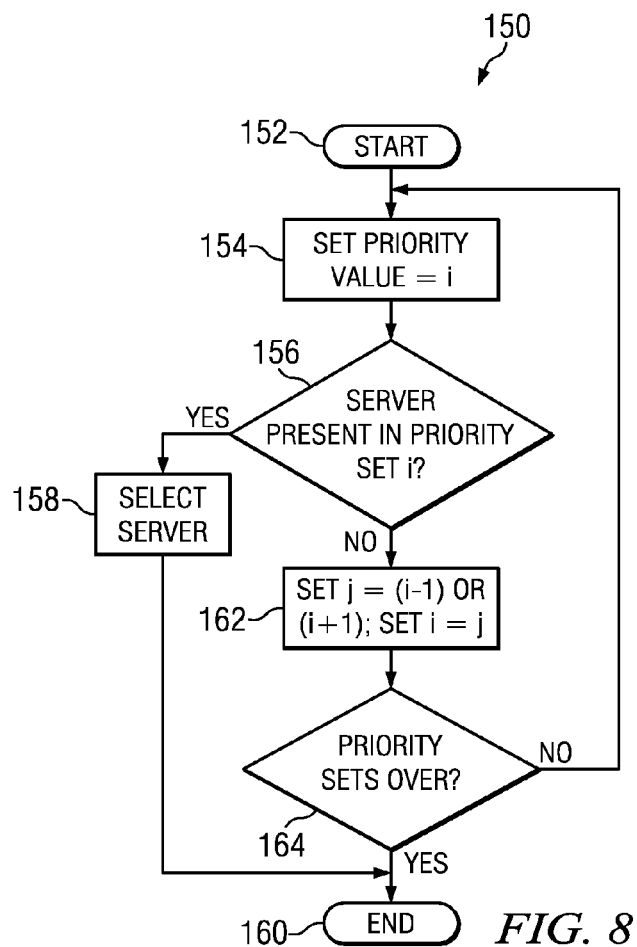
FIG. 5 is a simplified diagram illustrating example details of the communication system in accordance with one embodiment.
FIG. 8 is a simplified flow diagram illustrating other example operations that may be associated with an embodiment of communication system.

Turning to FIG. 5, FIG. 5 illustrates two example orderings 100A and 100B of servers 12(1)-21(n) having ranks into priority sets with varying priority values. In both examples 100A and 100B, priority 28 may be provided in a range from 1 to 10. Ten priority sets having priorities from 1 to 10 may be created. Myriad other ranges and number of priority sets may be used within the broad scope of the embodiments. The priority sets may be created by populating them with servers 12(1)-12(n) having a desired rank percentile (e.g., with higher rank percentile indicating a higher powered/higher capability server). A higher rank percentile may indicate a higher powered or higher capability server. In the FIGURE, column 102 represents the rank percentile and column 104 represents the priority assigned to the corresponding priority set.

In example 100A, priority set P(i) may be assigned a priority i, and populated with servers having ranks in percentile $(11-i)*10$ to $(10-i)*10$. Thus, servers ranked in the $90^{th}$ percentile may be placed into a priority set with priority 1; servers ranked in the $10^{th}$ percentile may be placed into another priority set with priority 10, and so on. In another example, if there are 30 servers in server pool 14, the top three (1-3) ranked servers may be placed in priority set P(1) having priority 1; the next three (4-6) ranked servers may be placed in priority set P(2) having priority 2, and so on, until the last three (28-30) ranked servers may be placed in priority set P(10) with priority 10.

In example 100B, priority set P(1) having priority 1 may be populated with servers having ranks between the 100th and 88th percentile; priority set P(2) may be populated with servers having ranks between the 88th and 75th percentile; priority set P(3) may be populated with servers having ranks between the 75th and 65th percentile; priority set P(4) may be populated with servers having ranks between the 65th and 55th percentile; priority set P(5) may be populated with servers having ranks between the 55th and 45th percentile; priority set P(6) may be populated with servers having ranks between the 45th and 35th percentile; priority set P(7) may be populated with servers having ranks between the 35th and 25th percentile; priority set P(8) may be populated with servers having ranks between the 25th and 14th percentile; priority set P(9) may be populated with servers having ranks between the 14th and 7th percentile; and priority set P(10) may be populated with servers having ranks between the 7th and 0th percentile. Various other orderings and correspondence between rankings and priority may be used within the broad scope of the embodiments.

Figure 6:
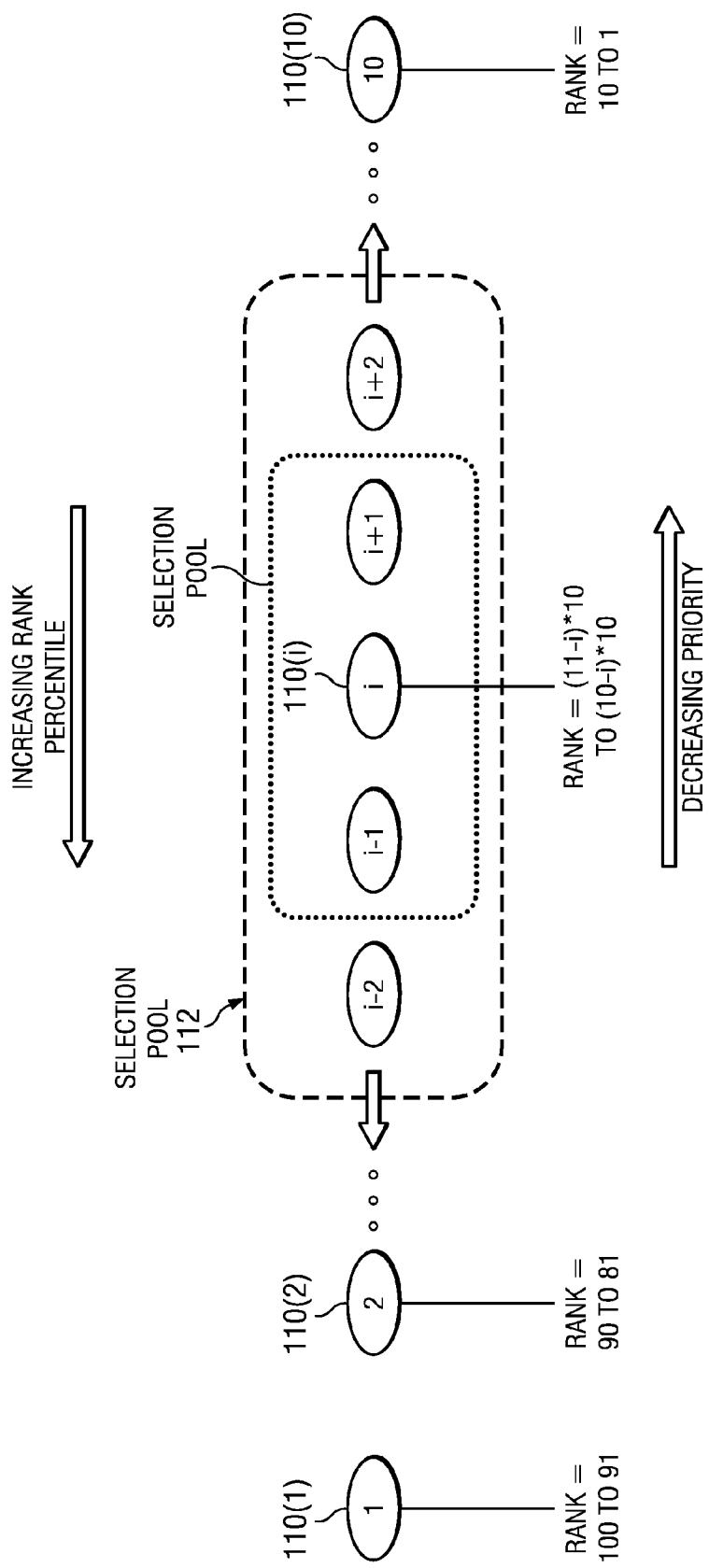
FIG. 6 is a simplified block diagram illustrating example details of the communication system in accordance with one embodiment.

Turning to FIG. 6, FIG. 6 is a simplified block diagram illustrating an example sequential selection according to an embodiment of communication system 10 for selecting suitable server 12(s) to be associated with service profile 26. Servers 12(1)-12(n) may be partitioned into priority sets 110 (1)-110(10) according to the embodiment. Although 10 priority sets are shown in the example, any number of priority sets may be used within the broad scope of the embodiments. Each priority set 110(i) may have associated priority 28 having value i. For example, priority 28 of priority set 110(1) may have a value of 1; priority 28 of priority set 110(2) may have a value of 2; and so on.

Servers 12(1)-12(n) may be grouped into priority sets 110 (1)-110(10) according to their rank percentile. For example, servers with the highest 10% of scores may be populated in priority set 110(1); servers with the next 10% of scores may be populated in priority set 110(2); and so on. Servers with ranks from $(11-i)*10$ to $(10-i)*10$ may be populated into priority set 110(i). Any suitable grouping may be implemented within the broad scope of the present disclosure. In an embodiment where lower priority value indicates a higher priority, the higher ranked servers may be populated into priority sets with lower priority values. Thus, servers with higher capability and more power budget may have a higher chance of being associated with service profiles having higher priority.

In various embodiments, priority sets 110(1)-110(10) may be searched sequentially, such as in a round robin manner. For example, to select suitable server 12(s) for service profile 26 with priority 28 having value i, the iterative selection process may start with a first iteration at priority set 110(i). Starting at priority set 110(i) may allocate a fair share for priority value "i" through reservation. If priority set 110(i) does not have any servers populated therein, other priority sets may be searched. In an example embodiment, the selection may be sequential, with a flexible selection pool 112. In the second iteration, selection pool 112 may include priority sets having priority (i−1) and (i+1). If there are no servers in selection pool 112 with priority sets having priority (i−1) and (i+1), selection pool 112 may be expanded to include priority sets having priority (i−2) and (i+2); and so on, like an expanding ring, until suitable server 12(s) is found. Such a sequential selection process may maintain fair share for scenarios with unequal priority distribution.

In various embodiments, priority sets 110(1)-110(10) may be searched sequentially according to an ascending order. If priority 28 has value 1, then selection pool 112 may include only priority sets with values higher than 1 (as there are no priority sets having values lower than 1) in the embodiment illustrated in the FIGURE. In various embodiments, priority sets 110(1)-110(10) may be searched sequentially according to a descending order. If priority 28 has value 10, then selection pool 112 may include only priority sets with values lower than 10 (as there are no priority sets having values higher than 10) in the embodiment illustrated in the FIGURE.

Figure 7:
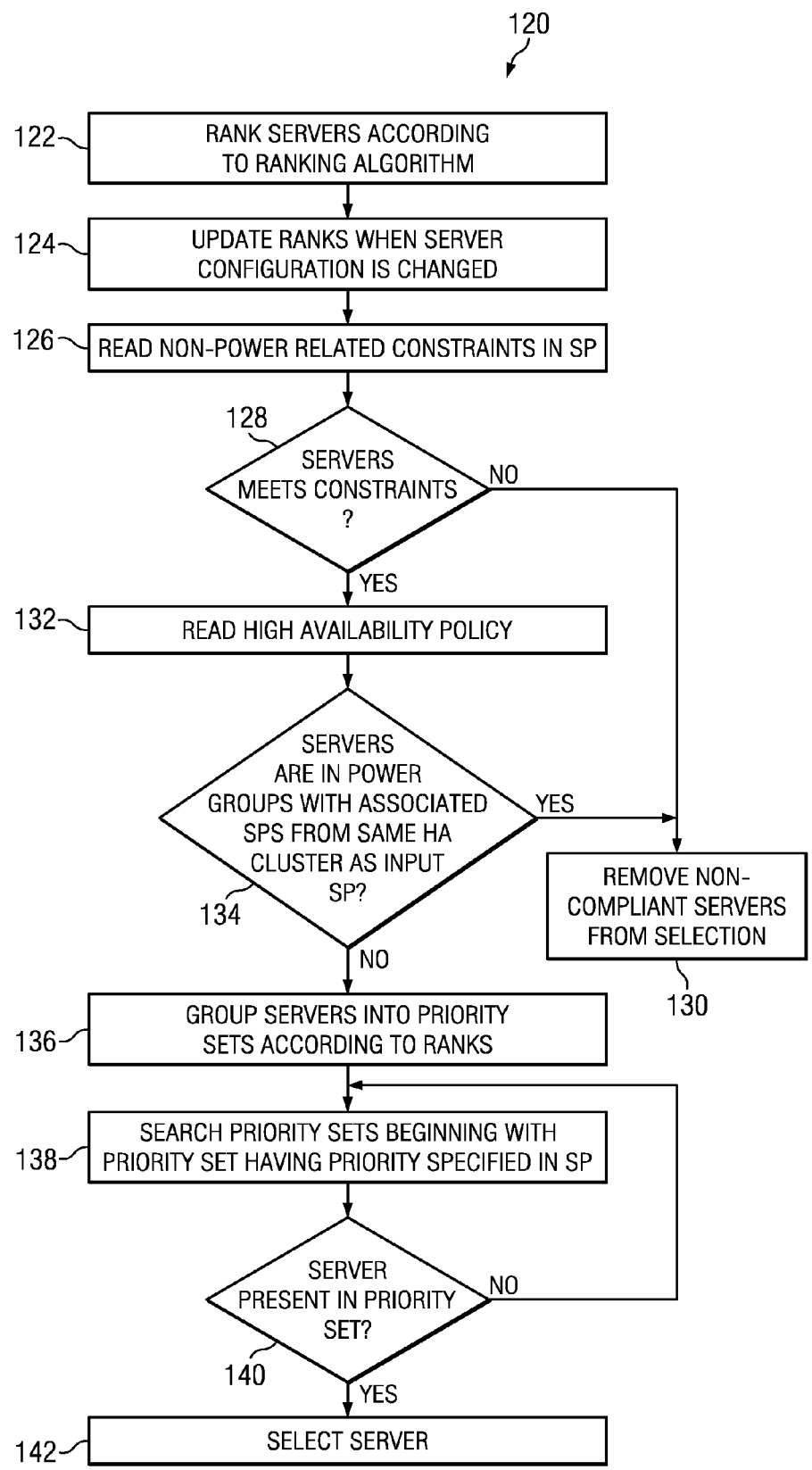
FIG. 7 is a simplified flow diagram illustrating example operations that may be associated with an embodiment of communication system.

Turning to FIG. 7, FIG. 7 is a simplified flow diagram illustrating example operations that may be associated with server selection in embodiments of communication system 10. Operations 120 may include 112, at which servers 12(1)-12(n) may be ranked according to a suitable ranking algorithm. At 124, the ranks may be updated when server configuration is changed (e.g., servers added to server pool 14, servers removed from server pool 14, servers associated with service profiles and thus no longer available for association, servers dissociated from server profiles and thus available for association). At 126, non-power related constraints in service profile 26 may be read. At 128, a determination may be made whether any servers in server pool 14 meet the non-power related constraints. Non-compliant servers (e.g., servers that do not meet the non-power related constraints) may be removed from selection at 130. At 132, relevant high availability policies may be read. At 134, a determination may be made whether any servers are in power groups with associated service profiles from the same high availability cluster as the service profile 26. Again, non-compliant servers (e.g., servers in the same high availability cluster) may be removed from selection at 130.

At 136, servers 12(1)-12(n) (pruned after removing non-compliant servers) may be grouped into priority sets 110(1)-110(10) having the priority value of priority 28 specified in service profile 26. At 138, priority sets 110(1)-110(10) may be searched, beginning with priority set 110(i) having priority value i specified in priority 28 of service profile 26. At 140, a determination whether any server is present in priority set 110(i) may be made. If not, additional priority sets may be searched until suitable server 12(s) is found. Suitable server 12(s) may be thus selected at 142.

Turning to FIG. 8, FIG. 8 is a simplified flow diagram illustrating example operations associated with selecting suitable server 12(s) according to embodiments of communication system 10. Operations 150 may start at 152, for example, when selection module 40 is activated. At 154, priority value may be set to "i" specified in priority 28 of service profile 26. At 156, a determination may be made whether any server is present in priority set 110(i). Any server in priority set 110(i) may be chosen as suitable server 12(s) at 158, and the operations may end at 160. If priority set 110(i) does not have any servers, the priority value may be changed to increase selection pool 112, so that additional priority sets are included in the selection process. For example, parameter j may be set to (i−1) or (i+1) at 162, and priority value may be set to j, and operations may loop back to 154. The operations may continue with sequential searching of priority sets ordered according to ranks until suitable server 12(s) is found.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, UCSM 20. In some embodiments, one or more of these features may be implemented in hardware, provided external to these elements, or consolidated in any appropriate manner to achieve the intended functionality. The various network elements (e.g., UCSM 20) may include software (or reciprocating software) that can coordinate in order to achieve the selection and placement operations as outlined herein. In still other embodiments, these elements may include any suitable algorithms, hardware, software, components, modules, interfaces, or objects that facilitate the operations thereof.

Furthermore, UCSM 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 34) can store data used for the selection and placement operations described herein. This includes the memory element being able to store instructions (e.g., software, logic, code, etc.) in non-transitory computer readable media such that the instructions are executed to carry out the selection and placement activities described in this Specification. A processor can execute any type of instructions associated with the data to achieve the operations detailed herein in this Specification. In one example, processors (e.g., processor 32) could transform an element or an article (e.g., data) from one state or thing to another state or thing. In another example, the selection and placement activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 34) for storing information to be used in achieving operations as outlined herein. These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   ranking a plurality of servers in a network environment according to power characteristics; and
   selecting a server from the plurality of servers for placement of a service profile according to, at least, a priority specified in the service profile and a particular rank associated with one of the plurality of servers.

2. The method of claim 1, wherein the ranking comprises:
   identifying power groups into which the plurality of servers is partitioned;
   identifying respective power group caps of the power groups;
   determining respective power ranges and respective power supply multipliers of the plurality of servers;
   calculating a score of each server in the plurality of servers; and
   assigning ranks to the scores.

3. The method of claim 2, wherein a particular one of the servers is ranked higher than the other servers based on a higher power group cap of the particular server's associated power group, the particular server's capability, and a number of power supply units accessible by the particular server.

4. The method of claim 2, further comprising:
   for each respective power group into which the plurality of servers are partitioned,
      identifying a respective power group cap; and
      determining a sum of power ranges for substantially all servers in each of the respective power groups.

5. The method of claim 2, further comprising:
   for each respective server in each respective power group,
      determining a power range and a power supply multiplier; and
      obtaining a score calculated as a product of a respective power group cap, the power range, and the power supply multiplier divided by a sum of power ranges; and
   ordering the plurality of servers according to a rank percentile.

6. The method of claim 1, wherein selecting the server comprises:
   identifying the service profile;
   identifying a server pool comprising a portion of the plurality of servers;
   partitioning the server pool into priority sets according to respective ranks of servers in the server pool, wherein each priority set is assigned a specific priority; and
   searching the priority sets beginning with a particular priority set having the priority specified in the service profile until a suitable server is found.

7. The method of claim 6, wherein the searching is performed sequentially based, at least, on the priority set having the priority specified in the service profile.

8. The method of claim 6, wherein the searching is performed sequentially according to an ascending order, and wherein the priority specified in the service profile is a lowest value of a predetermined range of priorities.

9. The method of claim 6, wherein the searching is performed sequentially according to a descending order, and wherein the priority specified in the service profile is a highest value of a predetermined range of priorities.

10. The method of claim 1, further comprising:
pruning a server pool, which comprises a portion of the plurality of servers, based on a high availability policy and non-power related constraints.

11. Logic encoded in non-transitory computer readable media that includes instructions for execution and when executed by a processor, is operable to perform operations, comprising:
ranking a plurality of servers in a network environment according to power characteristics; and
selecting a server from the plurality of servers for placement of a service profile according to, at least, a priority specified in the service profile and a particular rank associated with one of the plurality of servers.

12. The logic of claim 11, wherein the ranking comprises:
identifying power groups into which the plurality of servers is partitioned;
identifying respective power group caps of the power groups;
determining respective power ranges and respective power supply multipliers of the plurality of servers;
calculating a score of each server in the plurality of servers; and
assigning ranks to the scores.

13. The logic of claim 12, wherein a particular one of the servers is ranked higher than the other servers based on a higher power group cap of the particular server's associated power group, the particular server's capability, and a number of power supply units accessible by the particular server.

14. The logic of claim 12, the operations further comprising:
for each respective power group into which the plurality of servers are partitioned,
identifying a respective power group cap; and
determining a sum of power ranges for substantially all servers in each of the respective power groups.

15. The logic of claim 12, the operations further comprising:
for each respective server in each respective power group, determining a power range and a power supply multiplier; and
obtaining a score calculated as a product of a respective power group cap, the power range, and the power supply multiplier divided by a sum of power ranges; and
ordering the plurality of servers according to a rank percentile.

16. The logic of claim 11, wherein selecting the server comprises:
identifying the service profile;
identifying a server pool comprising a portion of the plurality of servers;
partitioning the server pool into priority sets according to respective ranks of servers in the server pool, wherein each priority set is assigned a specific priority; and
searching the priority sets beginning with a particular priority set having the priority specified in the service profile until a suitable server is found.

17. The logic of claim 16, wherein the searching is performed sequentially based, at least, on the priority set having the priority specified in the service profile.

18. An apparatus, comprising:
a memory element for storing data; and
a processor that executes instructions associated with the data, wherein the processor and the memory element cooperate such that the apparatus is configured for:
ranking a plurality of servers in a network environment according to power characteristics; and
selecting a server from the plurality of servers for placement of a service profile according to, at least, a priority specified in the service profile and a particular rank associated with one of the plurality of servers.

19. The apparatus of claim 18, wherein the ranking comprises:
identifying power groups into which the plurality of servers is partitioned;
identifying respective power group caps of the power groups;
determining respective power ranges and respective power supply multipliers of the plurality of servers;
calculating a score of each server in the plurality of servers; and
assigning ranks to the scores.

20. The apparatus of claim 19, wherein a particular one of the servers is ranked higher than the other servers based on a higher power group cap of the particular server's associated power group, the particular server's capability, and a number of power supply units accessible by the particular server.

* * * * *